United States Patent Office 3,116,648
Patented Jan. 7, 1964

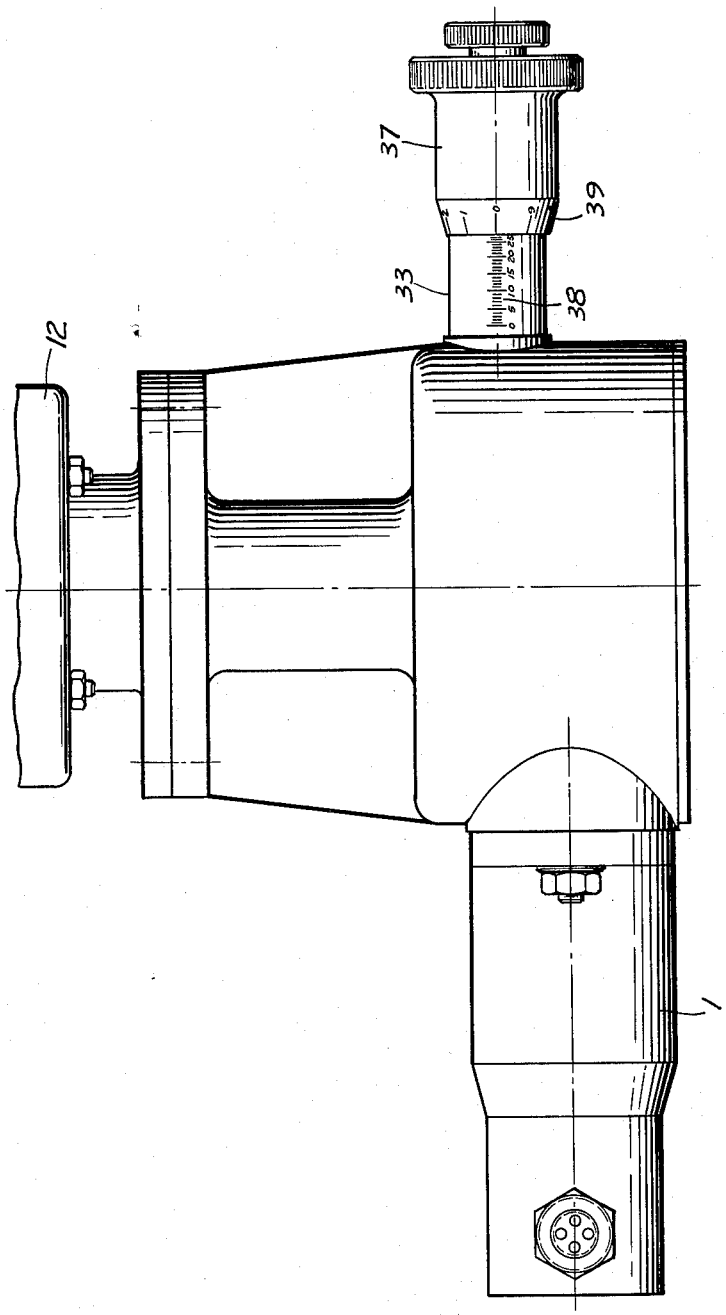

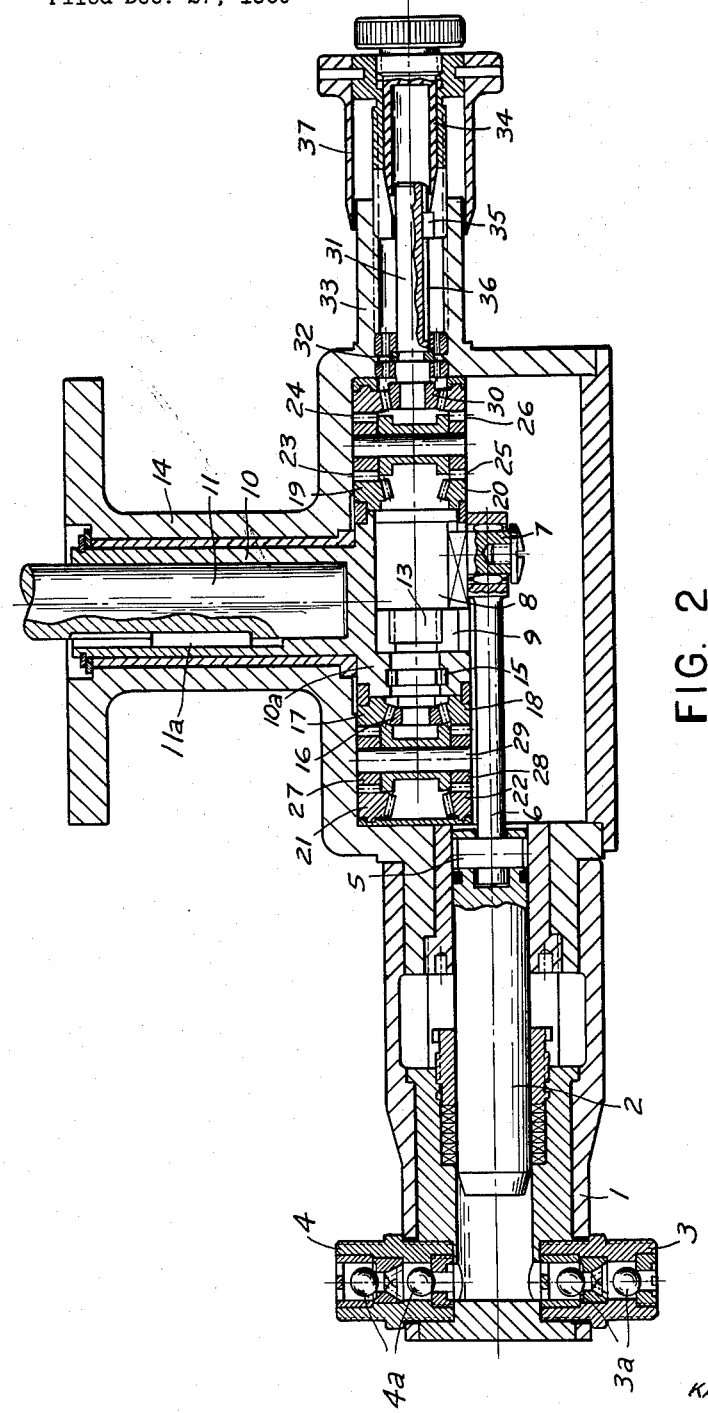

3,116,648
DOSING PUMP
Karl-Heinz Arenhold, Karlsruhe-Durlach, Germany, assignor to Chlorator G.m.b.H., Grotzingen, Karlsruhe, Germany, a German company
Filed Dec. 27, 1960, Ser. No. 78,553
Claims priority, application Germany Feb. 23, 1960
6 Claims. (Cl. 74—600)

The present invention relates to a dosing pump, and more particularly a piston operated dosing pump, the output of which can be metered between zero output and maximum output.

It is known to vary the output of piston operated dosing pumps of the general kind above referred to, by varying the length of the piston stroke in accordance with the desired output of the pump. Pumps of this kind have the disadvantage that the variation of the output by changing the length of the piston stroke is not linear over the entire range of adjustment. As a result, the accuracy of the metering of the pump and the accuracy of indications of the metered output vary widely within the range of adjustment. Obviously, such non-linear accuracy curve is highly undesirable. Furthermore, dosing pumps of this kind, as heretofore known, can only be operated at comparatively low revolutions, since operation at high revolutions tends to result in a breakdown of the rather delicate control mechanism.

It is the broad object of the present invention to provide a novel and improved piston operated dosing pump of the general kind above referred to, which can be conveniently and accurately set for a selected output and which can be operated at comparatively high revolutions.

A more specific object of the invention is to provide a novel and improved dosing pump which permits a gradual setting of the pump for any selected output between zero and maximum output.

Another more specific object of the invention is to provide a novel and improved dosing pump which affords the advantage of a uniform accuracy of metering and indication of the pump output for the entire dosing range thereof.

A further and more specific object of the invention is to provide a novel and improved dosing pump, the component parts of which are comparatively simple and rugged and which can be rapidly and inexpensively assembled.

Other and further objects, features and advantages of the invention will be pointed out hereinafter and set forth in the appended claims constituting part of the application.

In the accompanying drawing, a preferred embodiment of the invention is shown by way of illustration and not by way of limitation.

In the drawing:

FIG. 1 is an elevational view of a dosing pump according to the invention, and

FIG. 2 is an elevational longitudinal section of the pump of FIG. 1.

Referring now to the figures in detail, the exemplified dosing pump comprises a pump cylinder 1, in which the piston or plunger 2 reciprocates. A supply of the dosing fluid should be visualized as being connected to the pump by means of a one-way valve 3 and the metered dosing fluid is discharged by means of a one-way valve 4. As is evident, the suction stroke of the piston, that is, the stroke towards the right, will cause the opening of valve 3 by lifting valve balls 3a while maintaining closed valve 4 by pressing balls 4a thereof upon the respective seats, while during the pressure stroke of the piston, that is, the movement of the piston toward the left, valve 3 is closed and valve 4 is opened. The piston or plunger 2 is linked by a joint 5 to a piston rod 6, which is linked to and driven by a crank pin 7. The crank pin is mounted on a slide 8 which is slidable in guide tracks 9 formed on a flange 10a of a sleeve 10. Sleeve 10 is keyed or splined by means of splines 11a to a driving shaft 11 of a motor 12. Sleeve 10 is rotatable in pump housing 14. As can be seen in FIG. 2, guide tracks 9 extend transversely or radially of the rotational axis of driving assembly 10, 11. Accordingly, the eccentricity of slide 8 and with it of crank pin 7 are controlled by the position of slide 8 in reference to the rotational axis of shaft 11. Sleeve 10 and shaft 11 constitute the shaft portion of a crank shaft and crank pin 7 and slide 8, the crank portion of the crank shaft. Slide 8 can be displaced in its guide tracks 9 by means of a threaded control spindle 13, which extends through a bore through flange portion 10a of sleeve 10. The spindle can be rotated within the flange, but not longitudinally displaced in reference thereto. The axis of spindle 13 intersects the rotational axis of shaft 11, so that crank pin 7 can be placed in any desired position of eccentricity between zero eccentricity and maximum eccentricity by rotating spindle 13. To effect rotation of the spindle, the end of the spindle protruding from sleeve flange 10a seats a conical pinion 16 rotatable in unison with the spindle. Pinion 16 is in mesh with two bevel rings 17 and 18, which are disposed on opposite sides of the pinion, coaxial with the rotational axis of shaft 11. The bevel rings are fitted with their outer peripheral surfaces in pump housing 14 and are rotatable in reference to the pump housing and driving sleeve 10. A rotation of shaft 11 and sleeve 10 effects a rotation of the two bevel rings. Pinion 16 functions as a coupling member, but does not rotate about its own axis and merely revolves in a circular orbit about the rotational axis of shaft 11. The pinion is rotated about its own axis only when the two bevel rings are rotated relative to each other, for instance, when bevel ring 17 is rotated upwardly and bevel ring 18 downwardly in reference to the plane of the drawing. Such rotation of pinion 16 is transmitted to control spindle 13, thus correspondingly displacing slide 8 and with it the eccentricity of the crank pin 7.

Rotation of the bevel rings and with it the adjustment of the effective eccentricity are effected by means of an outer pair of bevel rings 21 and 22, which are fitted in housing wall portions 19 and 20. Bevel rings 21 and 22 are coaxial with bevel rings 17 and 18 and are also rotatable in reference to the pump housing.

All the bevel rings have on their cylindrical surfaces facing each other additional gear rings 23 through 26. Gear rings 23 and 24 are coupled by a spur gear 27, and similarly gear rings 25 and 26 are coupled by a spur gear 28. Spur gears 27 and 28 are seated on a common shaft 29 on which they are rotatable independent of each other. Outer bevel gears 21 and 22 are coupled by a conical pinion 30, which is rigidly fitted on a shaft 31 which protrudes from pump housing 14. Shaft 31 is journaled in a bushing 33 by means of a suitable bearing, such as an axial ball bearing 32. Bushing 33 is so mounted in housing 14 that it can be rotated, but not displaced in axial direction.

As has been pointed out before, pinion 16 coupling inner bevel rings 17 and 18 permits rotation of these bevel rings in the same rotational direction as sleeve 10 and shaft 11. The rotation of bevel rings 17 and 18 carries along spur gears 27 and 28, which are in mesh with inner bevel rings 17 and 18 and also roll on gear rings 24 and 26 of the outer pair of bevel rings 21 and 22. Hence, spur gears 27 and 28 rotate continuously between the two pairs of bevel rings. The outer bevel rings 21 and 22 do not change their spatial position relative to each other, since a rotation of these bevel rings is prevented by engagement with pinion 30 fitted on shaft 31. However, if pinion 30 is rotated, such rotation causes a corresponding relative rotation of bevel rings 21 and 22. A rotation of pinion 30 will rotate one of the bevel rings 21 or 22 upwardly in reference to the plane of the drawing and a rotation downwardly in reference to that plane of the other bevel ring. The rotation of bevel rings 21 and 22 is transmitted by spur gears 27 and 28 to bevel rings 17 and 18 of the inner pair of bevel rings. The transmission of the rotation of the outer rings is effected in the opposite sense, so that the one ring of the inner pair will be turned upwardly and the other downwardly in reference to the plane of the drawing. As a result of the rotation of bevel rings 17 and 18 relative to each other, pinion 16 is rotated about its own axis and rotates spindle 13 correspondingly, thus placing slide 8 and with it crank pin 7 in a different position of eccentricity in reference to the rotational axis of the drive assembly 10, 11. As is evident, the rotation of the bevel rings in reference to each other is entirely independent of the rotational speed of shaft 10 and sleeve 11. The displacement of crank pin 7 in reference to its zero or neutral position is controlled solely by the position of pinion 30 and is effected along a rectilinear plane.

To permit a metering of the dosing with high accuracy, adjustment means are provided. These adjustment means may be arranged in the manner of a micrometer gauge. For this purpose, bushing 33, in which shaft 31 of pinion 30 is journaled, has an internal thread in which a second externally threaded bushing 34 is screwed. Bushing 34, which slidably receives shaft 31, has at its inner wall a wedge-shaped protrusion 35 guided in a longitudinal keyway 36 in shaft 31. When now bushing 34 is screwed deeper into bushing 33, the rotation of bushing 34 is transmitted by wedge 35 to shaft 31, thus effecting a corresponding change in the eccentricity of the crank pin 7 and with it of the output of the pump. Bushing 34 is encompassed by a sleeve 37 which slides along the outer wall of bushing 33 when bushing 34 is screwed into bushing 33. Bushing 33 and sleeve 37 bear a coarse scale 38 and a fine or vernier scale 39. The scales are calibrated in correspondence with the output of the pump. The micrometer or vernier adjustment makes it convenient to adjust the output of the pump very accurately and also to read it very accurately. The accuracy obtained by the adjustment arrangement proper is preserved by the aforedescribed transmission means of the invention by which the output is set for the desired metering of the dosing fluid.

As is evident, the setting of the pump output need not be manually effected, but the control shaft 31 may be coupled to a motor which is remote controlled. Suitable and accurate follow-up systems for a remote control of the pump setting are well known in the art.

While the invention has been described in detail with respect to a certain now preferred example and embodiment of the invention, it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A variable stroke mechanism for a piston-operated dosing pump with adjustable output, said mechanism comprising a driven crank shaft having a shaft portion and a crank portion for reciprocating the piston of the pump, and adjustment means for varying the effective eccentricity of the crank portion in reference to the shaft portion to control the length of the stroke of the piston, said adjustment means including guide tracks supported by the shaft portion and extending radially to the axis thereof, said crank portion being separate from said shaft portion and slidably guided in said guide tracks to vary the position of the crank portion between a position of minimum eccentricity and a position of maximum eccentricity, a control spindle threaded on one end into said crank portion, rotation of said spindle displacing said crank portion in reference to the rotational axis of the shaft portion, a pinion secured to the other end of said spindle coaxially therewith, a pair of bevel rings disposed on opposite sides of said pinion and engaging the teeth thereof, said bevel rings being mounted coaxially with said shaft portion and rotatable independent of each other, relative rotation of said bevel rings effecting rotation of said pinion and control spindle whereby the length of the piston stroke, and thus the output of the pump, are correspondingly varied, and actuating means for rotating said bevel rings relative to each other, said actuating means including a second pair of independently rotatable bevel rings, coupling means coupling one bevel ring of the first pair with one bevel ring of the second pair, and drive means drivingly coupled with both bevel rings of the second pair for rotating the same relative to each other, whereby rotation of said drive means in either direction effects a corresponding directionally opposed rotation of the bevel rings of the first pair relative to each other.

2. A stroke mechanism according to claim 1 wherein said second pair of independently rotatable bevel rings is mounted coaxially with said shaft portion and said first pair of bevel rings encompassing the latter, and wherein said coupling means comprise a pair of coupling gears each coupling one bevel ring of the first pair with one bevel ring of the second pair, a common shaft rotatably seating said coupling gears.

3. A stroke mechanism according to claim 1 wherein the peripheral sides of the bevel rings of both pairs facing each other are toothed, and said coupling gears are in mesh with said peripheral teeth.

4. A stroke mechanism according to claim 1 wherein wall portions of the bevel rings of the second pair are toothed and wherein said drive means comprise a pinion in mesh with the toothed wall portions of both bevel rings, and a rotatable shaft fixedly seats said pinion of the drive means whereby rotation of said shaft effects a corresponding variation of the eccentricity of said crank portion.

5. A stroke mechanism according to claim 4 wherein a vernier drive is drivingly connected with said rotatable shaft to effect a fine adjustment of the angular adjustment of the same.

6. A stroke mechanism according to claim 1 wherein said guide tracks, control spindle, pinion, and bevel rings are disposed symmetrically in reference to the center axis of said control spindle.

References Cited in the file of this patent

UNITED STATES PATENTS

| | | |
|---|---|---|
| 1,352,716 | Winters | Sept. 14, 1920 |
| 1,557,527 | Hazelton | Oct. 13, 1925 |
| 2,503,907 | Hefler | Apr. 11, 1950 |
| 2,592,237 | Bradley | Apr. 8, 1952 |
| 2,892,360 | Ill | June 30, 1959 |